United States Patent [19]

Wuhrer et al.

[11] 3,770,475
[45] Nov. 6, 1973

[54] PROCESS FOR PRODUCING HYDRATES OF CALCIUM-MAGNESIUM SILICATES

[75] Inventors: Josef Wuhrer, Wulfrath; Heinz Georg Kurczyk, Monchengladbach; Adrian Ottenheym, Wulfrath, all of Germany

[73] Assignee: Rheinische Kalksteinwerke GmbH, Wulfrath, Germany

[22] Filed: June 8, 1971

[21] Appl. No.: 151,139

[30] Foreign Application Priority Data
June 9, 1970  Germany.................. P 20 28 227.3
July 28, 1970  Germany.................. P 20 37 252.5

[52] U.S. Cl. .............................. 106/306, 106/309
[51] Int. Cl. .............................................. C09c 1/02
[58] Field of Search .................. 106/306, 120, 309; 423/331

[56] References Cited
UNITED STATES PATENTS

| | | | |
|---|---|---|---|
| 697,319 | 4/1902 | Brown | 106/120 |
| 1,666,936 | 10/1925 | Kern | 106/120 |
| 2,314,188 | 3/1943 | Allen | 106/306 |
| 3,597,255 | 8/1971 | Toonder | 106/306 |

*Primary Examiner*—Delbert E. Gantz
*Assistant Examiner*—J. V. Howard
*Attorney*—Christen and Sabol et al.

[57] ABSTRACT

Hydrates of calcium-magnesium silicates are produced by the hydrothermal reaction of the oxides or hydroxides of calcium and magnesium with silicic acid in the presence of water. The reaction product may be further treated with carbon dioxide.

7 Claims, No Drawings

PROCESS FOR PRODUCING HYDRATES OF CALCIUM-MAGNESIUM SILICATES

The present invention relates to the production of hydrates of calcium-magnesium silicates. More particularly, the present invention relates to the production of said hydrates by a hydrothermal reaction of the oxides or hydroxides of calcium and magnesium with silicic acid.

It has been known that silicic acid and lime are converted into hydrosilicates in the presence of water at temperatures above about 150°C, and especially from 170° to 200°C. under prolonged and continued heating. Depending on the lime-silicic acid ratios selected and the temperatures used, the various hydrosilicates both of the tobermoritic group (calcium silicate pentahydrate) as well as of the wollastonite group will form. However, in order to achieve the desired conversions, not only high temperatures and pressures are required, but the starting substances must be in a finely comminuted state and the required heating time is lengthy.

It has therefore been proposed in copending application Ser. No. 859,407 now abandoned to produce calcium hydrosilicates through the hydrothermal conversion of lime and silicic acid in approximately equivalent quantities at elevated temperatures and under pressure. The starting substances of lime and silicic acid are mixed gradually with 10 to 40 percent by weight water in a closed vessel whereby temperatures above 200°C occur as a result of the hydration heat of the lime, while simultaneously the entire mixture is comminuted.

The hydrosilicates which are obtained are of very fine grain and have a large surface area. They are suitable for direct use in many applications. It was also found that synthetic wollastonite can be produced in a very simple manner through the subsequent dehydration of the hydrosilicates to $\beta$-wollastonite. This $\beta$-wollastonite can subsequently be heated to a temperature above the $\alpha/\beta$ conversion point to produce a coarse crystalline wollastonite, whereby it is converted into $\alpha$-wollastonite in a relatively short time. This $\alpha$-wollastonite can be changed again through heating to temperatures of around 1,200°C and through slow cooling off in this temperature range into the known coarse crystalline $\beta$-wollastonite.

Diopside is the silicate of calcium and magnesium and is a valuable raw material for the ceramic industry. Naturally occurring diopside is not found in large quantities and is often not desirable for ceramic purposes. It has therefore been proposed in copending application Ser. No. 27,434 now U.S. Pat. No. 3,652,207 synthetic diopside. Calcium and magnesium hydrosilicates are first produced through the hydrothermal conversion of dolomite and silicic acid in approximately equivalent quantities at elevated temperatures and under pressure. The starting substances of dolomite and silicic acid are mixed gradually with 10 to 40 percent by weight of water, based on the weight of the starting substances, in a closed vessel, whereby temperatures above 170°C. and preferably above 200°C. occur as a result of the hydration heat of the CaO component of the dolomite. After the conversion an intimate mixture of the calcium hydrosilicate Xonotlite and the magnesium hydrosilicate Cerolite is formed and then converted to diopside by calcining, e.g., at a temperature between 1,200°C.

It is an object of the present invention to provide materials having basic activity which are suitable as fillers.

It is another object of the present invention to provide a process for the production of such materials by the hydrothermal reaction of calcined dolomite and silicic acid in the presence of water.

It is a further object of the present invention to provide such a process whereby the produced material possesses a predetermined graded basicity or reactivity which may be varied within broad ranges.

Still further objects and the entire scope of applicability of the present invention will become apparent from the detailed description given hereinafter, it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that hydrates of calcium-magnesium silicates can be produced by the hydrothermal reaction of the oxides or hydroxides of calcium and magnesium in a molar proportion of CaO : MgO of 0.5 to 1.5, with silicic acid in a molar proportion of CaO : $SiO_2$ of 1.5 to 2.5, in the presence of water.

The reaction is normally carried out in a saturated water vapor atmosphere and preferably at temperatures between 180° and 230°C. The water quantity required for the reaction amounts preferably to 1 part by weight, with relation to 1 part by weight of the starting mixture of silicic acid and oxides or hydroxides of calcium and magnesium. This mixture can most conveniently be treated since a pumpable slurry is obtained.

As starting components mixtures of caustically calcined oxides, hydroxides or calcined or hydrated dolomite or dolomitic limestone can be used. As the silicic acid component it is convenient to use finely ground quartz sand, because it favors the hydrothermal reaction.

The process itself can be carried out in conventional installations such as those used for hardening lime sandstone or gas concrete. However, it is convenient to simultaneously disintegrate or grind the reaction mixture during the hydrothermal reaction, since a considerably faster reaction has proven to occur in this way, producing the hydrates of the hydrosilicates. In addition, this feature permits the use of conventional coarse-grained pit sand as the silicic acid component, for example, a pit sand with grains of 0 to 3 mm. The resulting reaction times are in the order of 1 hour.

According to the present invention hydrates of calcium-magnesium silicates with graded basicity or graded reactivity, respectively, are obtained depending upon the choice of the proportions CaO : $SiO_2$ and CaO : MgO. For example, the basicity is increased when the contents of silicic acid and of magnesium in the mixture are decreased. On the other hand, however, the reactivity decreases when the combination of a low magnesium oxide content and a high silicic acid content is used. For most applications the suitable range for the CaO : $SiO_2$ proportion has been found to be from 1.8 to 2.2, and for the CaO : MgO proportion from 0.8 to 1.2. Even within these narrow limits the reactivity of the hydrates of the calcium-magnesium silicates can be varied within broad ranges and adapted to the desired applications.

The resultant materials according to the invention are extremely finely divided after the drying process and are excellently suited as fillers for many applications in which a basic activity is advantageous.

The following is a specific example of the above-identified embodiment of the present invention.

EXAMPLE 1

Seventy-five parts by weight of the hydrate of dolomite-limestone having a molar proportion of CaO : MgO of 1.0 and a heat loss of 19.15 percent were combined with 25 parts by weight of finely ground quartz sand, corresponding to a molar proportion of CaO : $SiO_2$ of 2.14, and 50 parts by weight of water to form a slurry which was thoroughly mixed. The slurry was heated in a heater to 190°C. with hot vapors for a period of 8 hours. The semi-solid reaction product was subsequently disintegrated and dried until it contained approximately 10 percent of residual moisture. After the drying process, a very finely divided powder was obtained.

The analysis of the dry powder resulted in the following weight composition:

$SiO_2$—26.80%

CaO—42.25%

MgO—29.15%

$R_2O_3$—1.91%

It has been further found that the basic activity of the hydrates of calcium-magnesium silicates can be further regulated, in a very simple way, by hydrothermally reacting the oxides or hydroxides of calcium and magnesium with the preferred molar proportion of 0.8 to 1.2 with silicic acid in the preferred molar proportion of CaO : $SiO_2$ of 1.8 to 2.2, in presence of water, and treating the reaction product with carbon dioxide.

According to this preferred embodiment it is not necessary to produce a particular product for each possible application, by means of hydrothermal hardening, and the production can be restricted to one basic or primary product which need only be subsequently treated with carbon dioxide. By nature, a small $CO_2$-absorption represents a small reduction of basicity and a high $CO_2$-absorption indicates a greater reduction of the basicity. Preferably the carbon dioxide treatment is continued until a $CO_2$-absorption of 2 to 25 percent by weight is achieved. Even more preferably, the $CO_2$-absorption is from 18 to 22 percent by weight and in this embodiment the treatment with carbon dioxide is carried out with a reaction product which contains from 5 to 20 percent moisture therein. The $CO_2$-absorption depends upon the duration of the treatment and, of course, also upon the concentration of carbon dioxide in the treating atmosphere.

The treatment with carbon dioxide can be achieved by gassing the products with pure carbon dioxide in an atmosphere of pure carbon dioxide, or with gases containing carbon dioxide such as exhaust gases, until the desired $CO_2$-absorption is reached. A further embodiment of the treatment with carbon dioxide consists in simply exposing the hydrothermal reaction product to the atmosphere during longer periods of time; in this way, $CO_2$ contents of up to 18 percent $CO_2$ have been obtained after a storage of four weeks in the atmosphere. Further, it is possible to perform the carbon dioxide treatment with aqueous solutions of alkali carbonates or alkali bicarbonates. The alkali is then separated by a subsequent washing.

The materials obtained according to this embodiment of the present invention are characterized by the following compositions:

CaO—40.8 to 47.9 % by weight

MgO—17.4 to 37.7 % by weight $SiO_2$—20.4 to 39.0 % by weight $CO_2$—2.0 to 25.0 % by weight wherein the values for CaO, MgO and $SiO_2$ refer to a heat loss-free analysis. These materials are excellently suited as fillers with basic reactivity for water glass. With additions of approximately 8 to 12 percent the hardening speed of the water glass can be regulated within broad limits. In addition, these materials are also suitable as fillers for many other applications, in which a certain basic activity is critical.

The following is a specific example of the above-described embodiment of the present invention.

Example 2

Seventy-five parts by weight of the hydrate of dolomite-limestone having a molar proportion of CaO : MgO of 1.0 and a heat loss of 19.15 percent were combined with 25 parts by weight of finely ground quartz sand, corresponding to a molar proportion of CaO : $SiO_2$ of 2.14, and 50 parts by weight of water to form a slurry which was thoroughly mixed. The slurry was heated in a heater to 190°C. with hot vapors for a period of 8 hours. The semi-solid reaction product was subsequently disintegrated and dried until it contained approximately 10 percent residual moisture. Then the reaction product was brought into contact with pure carbon dioxide for a period of 24 hours at room temperature. The analysis of the dry product resulted in the following weight values:

$SiO_2$—20.99 %

CaO—33.88 %

$CO_2$—20.0 %

MgO—23.37 %

$R_2O_3$—1.59 %

While in the present invention one preferred quantity of water for the hydrothermal conversion is 1 weight part per weight part of the mixture of dry ingredients, the amount of water may range from 0.5 weight parts to 1.5 weight parts per weight part of the dry mixture. Furthermore, whereas quartz sand, e.g. pit sand is preferred, the silicic acid component may also be supplied by diatomaceous earth, pearlsinter, or flint.

What is claimed is:

1. A process for the production of hydrates of calcium-magnesium silicates which comprises hydrothermally reacting the oxides or hydroxides of calcium and magnesium in a CaO : MgO molar proportion of from 0.8 to 1.2 with silicic acid in a CaO : $SiO_2$ molar proportion of from 1.8 to 2.2 in the presence of water, and then treating the product thus obtained with carbon dioxide.

2. The process according to claim 1 wherein the treatment with carbon dioxide consists in gassing the reaction product with a carbon dioxide containing gas until said product absorbs from 2 to 25 percent by weight of carbon dioxide.

3. The process according to claim 2 wherein the product absorbs from 18 to 22 percent by weight of carbon dioxide.

4. The process according to claim 3 wherein the reaction product initially contains from 5 to 20 percent moisture.

5. The process according to claim 1 wherein the reaction is carried out at a temperature between 180° and 230°C.

6. The process according to claim 1 wherein the water is present in an amount between 0.5 and 1.5 weight parts per weight part of the remaining reactants.

7. The process according to claim 1 wherein the calcium and magnesium reactants are supplied by a member selected from the group consisting of dolomite, dolomite-limestone and a mixture thereof.

* * * * *